United States Patent [19]
Ebner et al.

[11] Patent Number: 4,804,596
[45] Date of Patent: Feb. 14, 1989

[54] ELECTRODE MATERIAL/ELECTROLYTE SYSTEM FOR NON-AQUEOUS CELLS

[75] Inventors: Walter B. Ebner, Warminster, Pa.; Hsiu-Ping W. Lin, Cherry Hill, N.J.

[73] Assignee: Honeywell Inc., Minneapolis, Minn.

[21] Appl. No.: 146,536

[22] Filed: Jan. 21, 1988

[51] Int. Cl.[4] ............................................ H01M 6/14
[52] U.S. Cl. .................................. 429/194; 429/197; 429/218
[58] Field of Search ............... 429/194, 197, 199, 218; 252/182.1

[56] References Cited

U.S. PATENT DOCUMENTS 4,463,071 7/1984 Gifford et al. ...................... 429/194
4,497,726 2/1985 Brule et al. ........................ 252/182.1

Primary Examiner—Anthony Skapars
Attorney, Agent, or Firm—C. G. Mersereau

[57] ABSTRACT

A lithium non-aqueous secondary electrochemical cell is disclosed having an ester-based organic electrolyte solution and a cathode active material comprising $Li_xCoO_2$, $(0 < x \leq 1)$.

14 Claims, 2 Drawing Sheets

ELECTRODE MATERIAL/ELECTROLYTE SYSTEM FOR NON-AQUEOUS CELLS

BACKGROUND OF THE INVENTION

The invention herein described was made in the course of or under a contract or subcontract thereunder with the Department of the Navy.

1. Field of the Invention

The present invention relates generally to the field of high energy non-aqueous electrochemical cells and, more particularly, to an active cathode material and electrolyte solution that, when in combination, can offer significant advantages for both primary and rechargeable cell applications.

2. Description of the Prior Art

Secondary or rechargeable active metal cells typically consist of a light, strongly reducing anode, normally an alkali metal such as lithium, an aprotic, non-aqueous solvent into which an appropriate quantity of a salt of the anode metal has been dissolved to form a conductive solution, and an oxidizing agent as the cathode material. While these cells have been shown to exhibit good cycle life capabilities, many of the prior art active cathode materials, such as $MoS_2$ and $TiS_2$, are low voltage, low energy density materials. In addition, most of the prior art electrolyte solutions, generally selected o their ability to efficiently recharge the anode, exhibit low conductivities and thus severely limit cell performance with respect to rate capabilities and low temperature operation.

One prior art development related to high energy density active cathode materials is the lithium intercalated compound $Li_xCoO_2$. This compound is disclosed in U.S. Pat. No. 4,497,726, 1985 and further discussed in K. Mizushima, P. C. Jones, P. J. Wiseman, and J. B. Goodenough, "$Li_xCoO_2$ ($0<X<1$): A New Cathode Material For Batteries of High Energy Density," Mat. Res. Bull., Vol. 15, 783(1980). This material offers outstanding performance capabilities, including good reversibility, but has not been used in cells because of the lack of a suitable electrolyte solution. The high oxidizing potentials required to charge $Li_xCoO_2$ decompose most conventional electrolyte solutions; and, since the material is manufactured in the discharged state and thus must be charged prior to use, this has prevented its application even in primary cells. The few prior electrolyte solutions that have been found to be compatible with $Li_xCoO_2$, such as $LiAsF_6$/sulfolane and $LiAsF_6$/methyl sulfolane, offer very low conductivities and are thus unsuitable for most cell applications.

Thus, there has remained a need for improvement in secondary active metal cells with respect to increasing energy density, rate capabilities, and low temperature performance.

SUMMARY OF THE INVENTION

The present invention involves a high energy lithium electrochemical system that can offer significant advantages over prior art rechargeable technologies. The advantages in energy density are illustrated in Table I which compares the theoretical energy densities of several known cathode materials, including that of the present invention. This system is also very attractive for primary cell applications.

The proposed electrochemical system consists of a lithium metal anode, and an active cathode material of $Li_xCoO_2$ ($0<X\leq1.0$) in combination a high conductivity ester-based electrolyte solution. Preferred solutions include those in which the ester solvent is selected form methyl formate ($HCOOCH_3$), methyl acetate ($CH_3COOCH_3$) and the like. Electrolyte salts include $LiAsF_6$, $LiBF_4$ (or combinations thereof), $LiClO_4$, $LiAlCl_4$, $LiGaCl_4$, and so on.

The cells of the present invention operate at or near 4.0 volts and offer theoretical energy densities in excess of 1000 Wh/Kg, over twice that yielded by $TiS_2$ or $MoS_2$. When combined with ester-based electrolyte solutions, the system of the present invention can operate at moderate to high discharge rates over a wide range of temperatures. In addition to high conductivities, ester-based solutions offer electrochemical stability superior to that of other non-aqueous solutions typically used in lithium cells and so are able to withstand the high potentials required to charge $Li_xCoO_2$ cells. Through combinations using the unique properties of ester-based solutions, therefore, $Li_xCoO_2$ becomes a viable cathode material for high energy density lithium cells in both primary and secondary applications.

DESCRIPTION OF THE PREFERRED EMBODIMENTS

Figure 1:
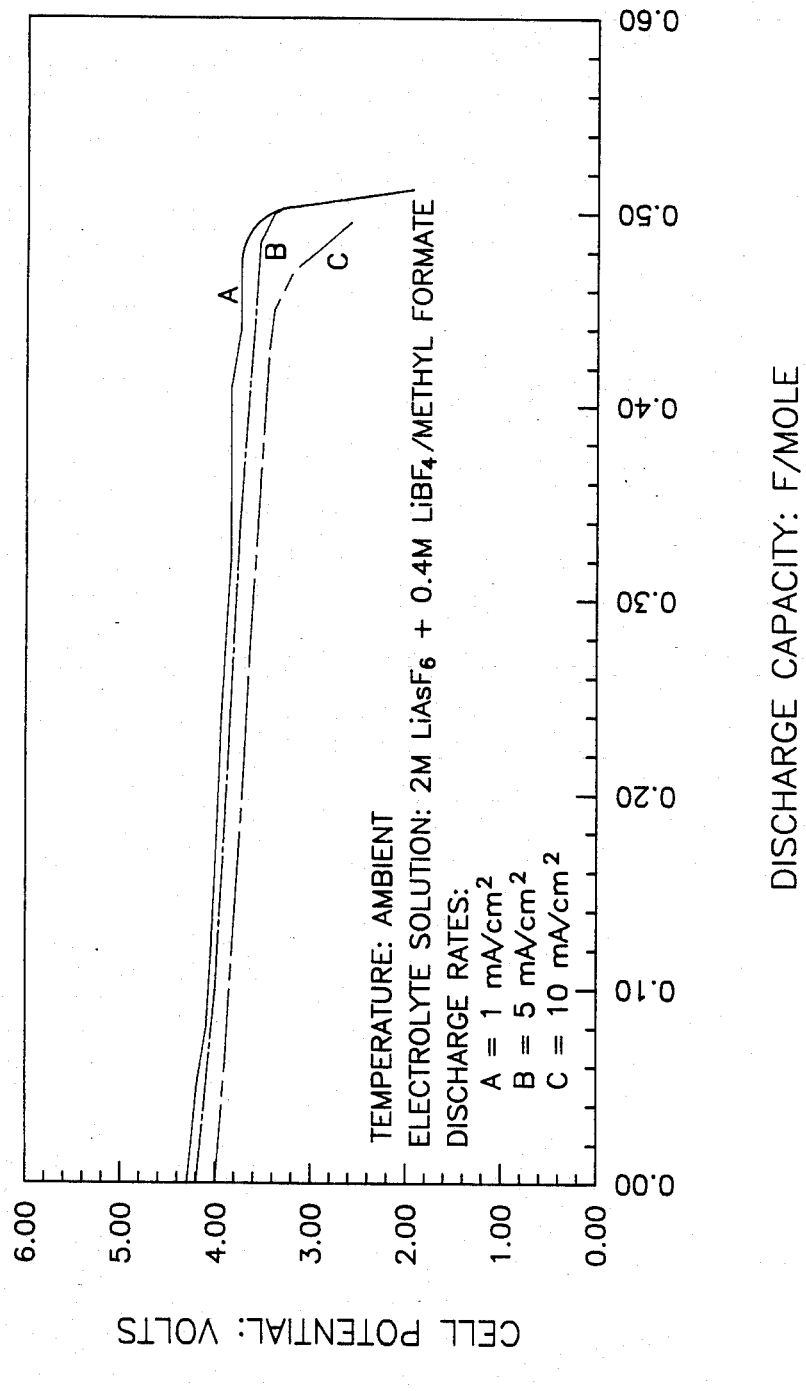
FIG. 1 illustrates the discharge performance of Li/$Li_xCoO_2$ laboratory cells at three different discharge rates at 25° C.

The present invention takes advantage of the unusually high energy density of $Li_xCoO_2$ cathode material by combining it with an electrolyte solution which can withstand the high operating potentials characteristic of this system, particularly during charging. It should be noted, however, that charging is a concern even for primary cell applications because $Li_xCoO_2$ is manufactured in the discharged state and all cells must therefore be charged before use.

The present invention describes an electrochemical system consisting of a lithium metal anode, a cathode having $Li_xCoO_2$ as the active cathode material, and an ester-based electrolyte solution.

This system offers superior capabilities over existing systems based on $Li_xCoO_2$ primarily due to the unique properties of ester-based electrolyte solutions. These solutions offer not only the excellent electrochemical stabilities needed to withstand the high oxidizing potentials present at $Li_xCoO_2$ cathodes but also possess high conductivities that can allow Li/$Li_xCoO_2$ cells to operate at high rates of discharge and at low temperatures. Hence, by combining $Li_xCoO_2$ with the unique and outstanding properties of ester-based electrolyte solutions, an electrochemical system is obtained that offers high energy density, reversibility, and good rate capabilities and which is thus suitable for a wide range of applications.

To demonstrate the performance of the system of the present invention, tests were conducted with laboratory cells constructed as follows:

The $Li_xCoO_2$ ($x=1.0$) was a commercial grade of material purchased from Morton Thiokol, Inc., Alfa Products (Catalog No. 13998). Cathodes consisted of 85 weight percent $Li_xCoO_2$, 10 weight percent of Vulcan XC-72R, trademark of Cabot Corporation of Boston, Mass., carbon as the conductive diluent, and 5 weight percent of Teflon powder (polytetrafluoroethylene) as the binder. The individual components were suspended in mineral spirits solvent and then mixed in a high speed blender. Electrodes were fabricated using a roll milling technique. The resulting cathodes were first air dried and then dried at 200° C. under vacuum. Laboratory cells were constructed using a lithium anode and a cathode separated by two or more layers of microporous polyethylene or polypropylene separator material. Each electrode had a geometric surface area of 3.2 cm². The anode consisted of lithium foil pressed onto a nickel expanded metal grid. The cathode employed an aluminum grid as the current collector and the cell assembly was supported between two glass plates. The cell was placed into a sealed vessel containing approximately 2 ml of a 2M $LiAsF_6$+0.4M $LiBF_4$/methyl formate electrolyte solution. The ends of the separator extended down into the electrolyte solution and thereby wicked the solution up into the cell stack.

Table I, compares theoretical values of many known cathode materials including that of the present invention. Note that the performance capabilities of the materials of the cell of the present invention show a drastic improvement over those of the prior art.

FIG. 1 depicts experimental results showing the excellent rate capabilities of the proposed system as evidenced by the little loss in delivered capacity or operating voltage that is observed when the discharge rate is increased from 1 mA/cm² to 10 mA/cm².

Figure 2:
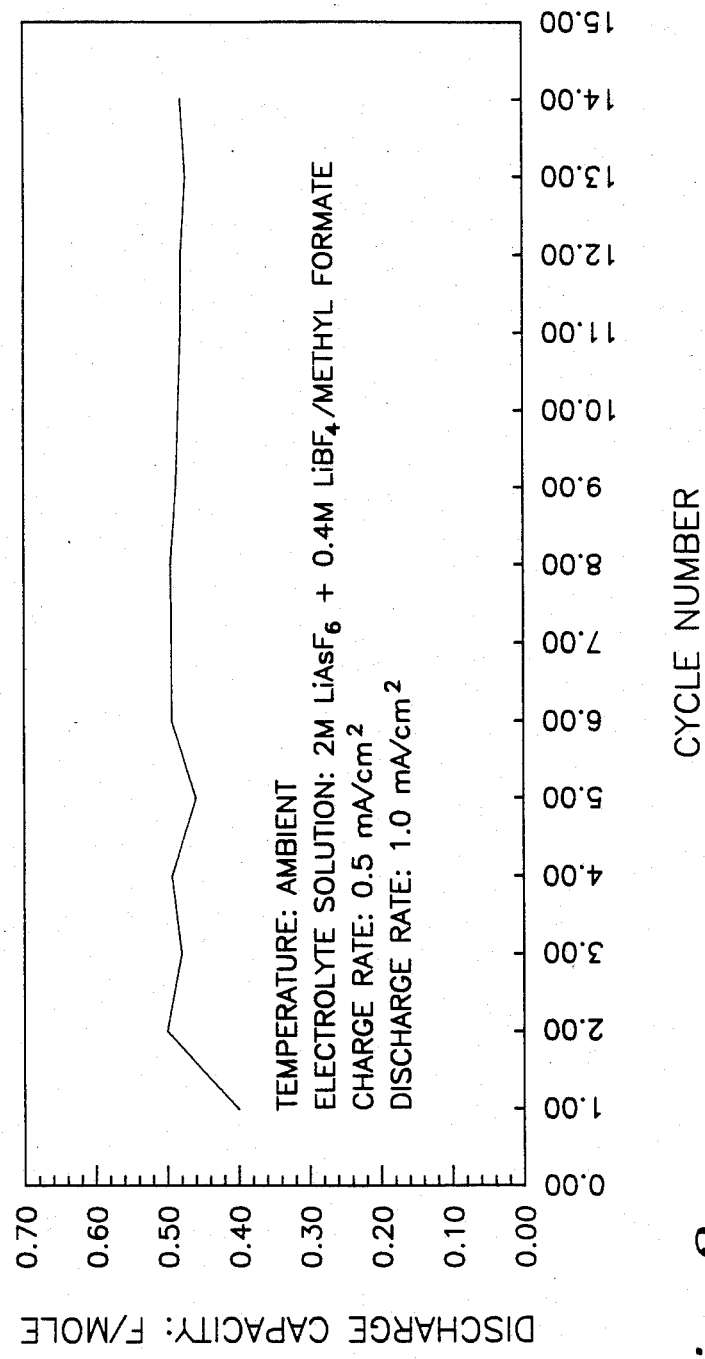
FIG. 2 graphically illustrates the delivered discharge capacity of a rechargeable Li/$Li_xCoO_2$ cell versus cycle number.

FIG. 2 illustrates the rechargeable performance of Li/$Li_xCoO_2$ cells in limited cycle life tests. The fact that the delivered capacity remains constant as the cell is cycled demonstrates the high reversibility of this cathode material.

What is claimed is:

1. An active metal non-aqueous electrochemical cell comprising:
    a lithium anode;
    an organic ester-based organic electrolyte solution and
    a cathode active material comprising $Li_xCoO_2$ where $0 < X < 1.0$.
2. The cell of claim 1 wherein said ester is selected from methyl formate, methyl acetate and combinations thereof.
3. The cell of claim 1 wherein said ester is methyl acetate.
4. The cell of claim 2 including an amount of $LiAsF_6$ electrolyte salt.
5. The cell of claim 3 including an amount of $LiAsF_6$ electrolyte salt.
6. The cell of claim 4 wherein the electrolyte includes an amount of $LiBF_4$.
7. The cell of claim 5 wherein the electrolyte includes an amount of $LiBF_4$.
8. A lithium non-aqueous secondary electrochemical cell having an ester-based organic eletrolyte solvent and a cathode active material comprising $Li_xCoO_2$, ($0 < X \leq 1$).
9. The cell of claim 8 wherein said electrolyte solvent is selected from methyl formate, methyl acetate and mixtures thereof.
10. The cell of claim 9 wherein said electrolyte solvent is methyl acetate.
11. The cell of claim 9 further comprising an amount of $LiAsF_6$ electrolyte salt.
12. The cell of claim 10 further comprising an amount of $LiAsF_6$ electrolyte salt.
13. The cell of claim 11 wherein the electrolyte further comprises an amount of $LiBF_4$.
14. The cell of claim 12 wherein the electrolyte further comprises an amount of $LiBF_4$.

TABLE I

INSERTION CATHODE COMPARISON OVER DEMONSTRATED REVERSIBLE OPERATING RANGE

| Cathode Material | Cycle DOD F/Mole | Discharge Cutoff Voltage V | Average Open Circuit Voltage, V | Delivered Specific Cathode Capacity, mAh/gm | Energy Density Wh/Kg |
|---|---|---|---|---|---|
| $TiS_2$ | 1.0 | 1.7 | 2.15 | 239 | 484 |
| $V_2O_5$ | 1.0 | 2.5 | 3.22 | 147 | 457 |
| $V_6O_{13}$ | 4.0 | 1.9 | 2.40 | 209 | 475 |
| $Li_{1.05}V_3O_8$ | 2.0 | 1.8 | 2.49 | 186 | 442 |
| $V_2S_5$ | 4.0 | 1.7 | 2.28 | 409 | 843 |
| $MoS_2$ (amorphous) | 1.0 | 1.5 | 1.89 | 167 | 303 |
| $MoS_3$ (amorphous) | 3.0 | 1.6 | 1.90 | 418 | 717 |
| $Li_xCo_{1.01}O_2$ | 1.0 | 3.9 | 4.24 | 293 | 1154 |

* * * * *